United States Patent
Fuller et al.

(10) Patent No.: US 10,419,648 B2
(45) Date of Patent: Sep. 17, 2019

(54) MAGNETIC CAMERA COUPLING SYSTEM

(71) Applicants: Ryan Mikah Fuller, Costa Mesa, CA (US); Tamio Stehrenberger, Costa Mesa, CA (US); Shahin Amirpour, Huntington Beach, CA (US); John McGuinness, Huntington Beach, CA (US); Christopher Lawrence Greaves, Huntington Beach, CA (US); Lane Gearle Brooks, Highland, UT (US)

(72) Inventors: Ryan Mikah Fuller, Costa Mesa, CA (US); Tamio Stehrenberger, Costa Mesa, CA (US); Shahin Amirpour, Huntington Beach, CA (US); John McGuinness, Huntington Beach, CA (US); Christopher Lawrence Greaves, Huntington Beach, CA (US); Lane Gearle Brooks, Highland, UT (US)

(73) Assignee: OPKIX, Inc., Costa Mesa, CA (US)

( * ) Notice: Subject to any disclaimer, the term of this patent is extended or adjusted under 35 U.S.C. 154(b) by 28 days.

(21) Appl. No.: 15/939,633

(22) Filed: Mar. 29, 2018

(65) Prior Publication Data

US 2018/0295264 A1 Oct. 11, 2018

Related U.S. Application Data

(60) Provisional application No. 62/483,334, filed on Apr. 8, 2017.

(51) Int. Cl.
*H04N 5/232* (2006.01)
*H04N 5/225* (2006.01)
(Continued)

(52) U.S. Cl.
CPC ......... *H04N 5/2253* (2013.01); *H04N 5/2251* (2013.01); *H04N 5/2257* (2013.01);
(Continued)

(58) Field of Classification Search
CPC ........ H04N 5/2253; H04N 7/18; H04N 5/232; H04N 5/2251; H04N 5/2257;
(Continued)

(56) References Cited

U.S. PATENT DOCUMENTS

| 8,896,694 B2 | 11/2014 | O'Donnell et al. |
| 9,124,796 B2 | 9/2015 | Blum et al. |

(Continued)

FOREIGN PATENT DOCUMENTS

| CN | 2850160 | 12/2006 |
| CN | 204101814 | 1/2015 |

(Continued)

OTHER PUBLICATIONS

Multi Use Portable Ultra HD 720P WIFI Control Wireless Camera / Action Camera Dec. 18, 2016 https://www.amazon.com/Portable-Control-Wireless-Camera-Action/dp/B01MYTYAH1.

(Continued)

*Primary Examiner* — Hung H Lam
(74) *Attorney, Agent, or Firm* — Trent Baker; Baker & Associates PLLC (57) ABSTRACT

A camera system including an integrated coupling system configured to releasable couple the camera system with a user head accessory such as a pair of glasses, a hat, a headband, an item of jewelry, etc. The camera module may have an outer dimension smaller than three cubic inches and may further include a data coupler, battery, lens, image sensor, circuit board, and microphone. The camera module may transmit and receive data from the portable computer device including video data and on/off recording, respectively. A magnetic coupling system configured to selectively releasably couple the camera module directly with the user head accessory including magnet(s) disposed within each of the camera module and the user head accessory.

20 Claims, 6 Drawing Sheets

(51) Int. Cl.
*H04N 7/18* (2006.01)
*H04B 1/3827* (2015.01)
*G02C 11/00* (2006.01)

(52) U.S. Cl.
CPC ......... *H04N 5/232* (2013.01); *H04N 5/23203* (2013.01); *H04N 7/18* (2013.01); *G02C 11/10* (2013.01); *G02C 2200/02* (2013.01); *H04B 1/3827* (2013.01)

(58) Field of Classification Search
CPC ................ H04N 5/23203; G02C 11/10; G02C 2200/02; H04B 1/3827
See application file for complete search history.

(56) References Cited

U.S. PATENT DOCUMENTS

| | | | |
|---|---|---|---|
| 9,628,707 | B2 | 4/2017 | Blum |
| 9,635,222 | B2 | 4/2017 | Blum |
| 2016/0026853 | A1 | 1/2016 | Wexler et al. |
| 2016/0048160 | A1 | 2/2016 | Haddick et al. |
| 2016/0182826 | A1* | 6/2016 | Blum ................. H04N 5/23241 348/372 |
| 2018/0115691 | A1* | 4/2018 | Gupta .................. H04N 5/2252 |
| 2018/0129078 | A1* | 5/2018 | Blum ..................... G02C 11/00 |

FOREIGN PATENT DOCUMENTS

| | | |
|---|---|---|
| CN | 204498235 | 7/2015 |
| WO | WO2016105480 | 6/2016 |

OTHER PUBLICATIONS

Pogo-Cam Nov. 28, 2016 http://www.pogotec.com/pogo-cam/.
Camsoy C1 Wearable Body micro camera Wireless Nov. 15, 2016 http://euro.gr/products/camsoy-c1-wearable-body-micro-camera-wireless-mini-dv-ip-magnetic-hd720p-compatible-with-gopro-accessories-bike-wifi-mini-camera/.
iON Camera SnapCam Wearable HD Camera Oct. 18, 2015 https://www.amazon.com/iON-Camera-SnapCam-Wearable-Bluetooth/dp/B012X08LOA.

\* cited by examiner

MAGNETIC CAMERA COUPLING SYSTEM

RELATED APPLICATIONS

This application claims priority to U.S. provisional application Ser. No. 62/483,334 filed Apr. 8, 2017 the contents of which are incorporated by reference.

FIELD OF THE INVENTION

The invention generally relates to camera systems used in conjunction with a portable computer device. In particular, the present invention relates to a camera system including an integrated coupling system configured to releasably, directly couple a camera module with an external user head accessory such as a pair of glasses, a hat, a headband, an item of jewelry, etc.

BACKGROUND OF THE INVENTION

Portable computing devices (PCD) such as smartphones, tablet phones, tablets, etc. have become ubiquitous among industrialized populations. PCDs are characterized by independent communication and computer processing. For example, PCDs include a radio capable of communicating wirelessly over one or more data frequencies (i.e. cellular, Bluetooth, Wi-Fi). PCDs further include computer components which enable the PCD to function independently of other computing devices, including processors, power sources, memory modules, etc.

PCDs include a variety of input components such as cameras, touch screen, biometric sensors, connectors, microphones, etc. which enable a user to input data into the PCD via various media. For example, a user may input video or photo data via an integrated camera within the PCD. The PCD may then process and display the video or photo data on an output component such as a display screen. The processing of data may include selective manipulation via various applications, or apps.

Conventional integrated PCD-based camera components are limited in their operation and utility. Most PCDs include one or more integrated photo and/or video camera components. However, the integrated camera components are inherently restricted to a location on the PCD device. Therefore, to capture both an image and view the real-time input of the photo/video component on the display screen of the PCD, a user is inherently limited in positioning and orienting the photo/video component. Likewise, video capture over a period of time is cumbersome because it requires a user to physically position the entire PCD in a manner to capture the desired video view angle.

Some of the restrictions of integrated PCD-based cameras are overcome by separate or independent camera systems, such as GO PRO® type devices, which are configured to transmit video and photo data with a PCD. One of the advantages of separated camera systems is the ability to externally mount them on a user for video recording that is synchronized with movement of a user's head. For example, rather than directing a separate PCD camera at a specific object to record, a camera may be mounted to a user's head to enable synchronized direction of the camera with the user's head movement. The synchronized direction of the camera enables a user to perform hands-free video recording during activities which do not permit manual manipulation of a camera. However, conventional separated cameras require cumbersome physical user-operated mounting structures such as brackets. The physical mounting structures may include specific mounts for helmets, headbands, necklaces, etc. The use of physical mounting structures requires that a user possess the necessary mounting hardware whenever a head mount is intended. However, a user is unlikely to carry a headband mount or helmet mount at all times, thereby preventing the use of video to record certain events.

Therefore, there is a need in the industry for a separate portable camera system that includes an integrated releasable coupling system.

SUMMARY OF THE INVENTION

The present invention relates to a portable camera system including an integrated user coupling system configured to releasably, directly couple a camera module with a user head accessory such as a pair of glasses, a hat, a headband, an item of jewelry, etc. The portable computer device may be a smartphone, tablet, or tablet phone having a total volume smaller than twenty cubic inches. The camera module may have an outer dimension smaller than three cubic inches and may further include an data coupler, battery, lens, image sensor, circuit board, and microphone. The camera module may transmit and receive data from the portable computer device, including video data and on/off recording, respectively. A magnetic coupling system configured to selectively releasably couple the camera module directly with the user head accessory includes magnet(s) disposed within each of the camera module and the user head accessory. The magnetic coupling system may further include the ability to align the camera module with respect to the user head accessory and the user's field of view.

Embodiments of the present invention represent a significant advance in the field of separated PCD-based camera systems. Conventional separated camera systems generally require cumbersome indirect coupling systems to allow for mounting on a user's head. For example, a specific bracket and mount may allow a conventional camera system to be indirectly coupled to a user's head accessory. Embodiments of the present invention provide a separated camera system that facilitates an intuitive, direct coupling scheme between the camera module and the user head accessory. The novel integration of magnet(s) within each of the camera module and user-head accessory provides a versatile direct releasable coupling system that does not require additional components. In addition, the magnet(s) of the camera module and user head accessory may automatically align the camera module with the user head accessory and/or user field of view.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to a portable camera system including an integrated user coupling system configured to releasably, directly couple a camera module with a user head accessory such as a pair of glasses, a hat, a headband, an item of jewelry, etc. The portable computer device may be a smartphone, tablet, or tablet phone having a total volume smaller than twenty cubic inches. The camera module may have an outer dimension smaller than three cubic inches and may further include an data coupler, battery, lens, image sensor, circuit board, and microphone. The camera module may transmit and receive data from the portable computer device, including video data and on/off recording, respectively. A magnetic coupling system configured to selectively releasably couple the camera module directly with the user head accessory includes magnet(s) disposed within each of the camera module and the user head accessory. The magnetic coupling system may further include the ability to align the camera module with respect to the user head accessory and the user's field of view. Also, while embodiments are described in reference to a visual camera system, it will be appreciated that the teachings of the present invention are applicable to other areas, including but not limited to other sensing systems such as audio, position, motion, infrared, microscopic, etc.

The following terms are defined as follows:

Releasably couple—a temporary coupling between two members which may reasonably be disengaged. For example, VELCRO is a type of releasable coupling.

Selectively couple—a coupling in which a user physically and intentionally engages or disengages the coupling.

Directly couple—a coupling between two members without intervening members. For example, a rock placed on the ground is directly coupled to the ground via a gravitational force because there are no intervening structures between the rock and ground.

Rotatable coupling—a coupling between two members which permits a selective rotation therebetween.

User head accessory—any structure configured to be disposed or worn on a user's head including but not limited to a headband, hat, glasses, sunglasses, piercing, earing, ear dongle, headphones, necklace, etc.

Field of view—a three-dimensional orientation corresponding to the visual view of a user's eye(s).

Magnetic coupling—a coupling between two members created by a magnetic force. Oppositely oriented magnetic poles create a magnetic attraction force between two magnets. One of the magnets may also be a magnetic material with multiple magnetic poles such as iron.

Figure 1:
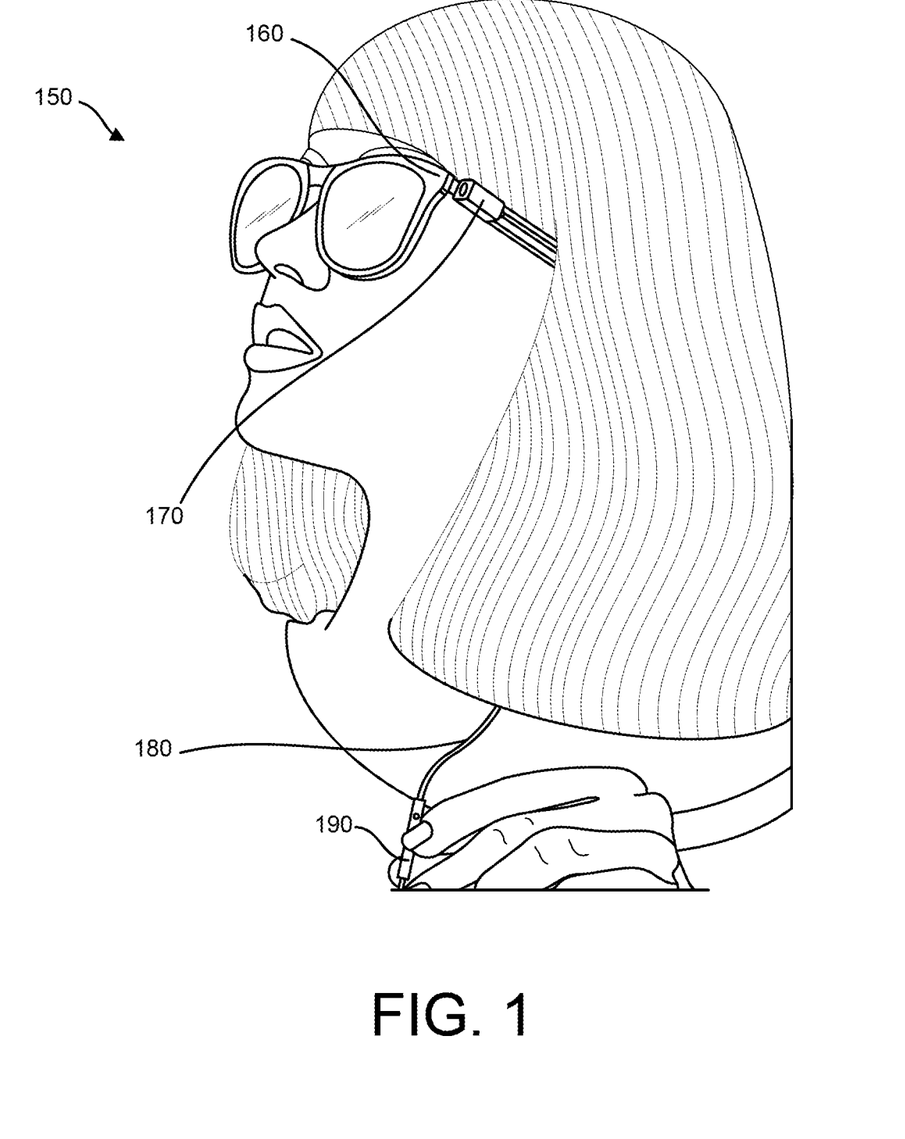
FIG. 1 illustrates an operational view of a camera system, including a camera module magnetically coupled to a user's sunglasses in accordance with embodiments of the present invention.

Reference is initially made to FIG. 1, which illustrates an operational view of a camera system, designated generally at 150. The camera system 150 includes a user head accessory (pair of sunglasses) 160, a camera module 170, a data coupler 180, an optional controller 190, and a portable computer device (not shown). The camera module 170 is releasably directly coupled to the user head accessory 160 via a magnetic coupling force. The camera module 170 and user head accessory 160 each include one or more magnets within their structure. For example, the camera module 170 may include magnet(s) disposed flush with an external surface oriented toward the sunglasses. The camera module 160 may further include magnets on other external or internal surfaces. Likewise, the frame of the sunglasses 160 may include one or more magnets or be in part composed of a magnetic material such as iron to facilitate the magnetic coupling. A glasses-type user head accessory will be described in further detail with reference to FIGS. 6A-D below. The releasable coupling between the camera module 170 and sunglasses 160 is unique in that it is direct and releasable. The releasable coupling does not require any type of mounting brackets or couplers to support the camera or clasp the sunglasses. Rather, a user may selectively and automatically engage the magnetic coupling by positioning the camera module 170 within proximity of the sunglasses 160. Likewise, a user may selectively disengage the magnetic coupling by physically separating the camera module 170 from the sunglasses 160. The data coupler 180 is configured transmit data between the camera module 170 and the controller 190 and/or portable computer device (not shown) via wired or wireless communication media. Although not illustrated, it will be appreciated that embodiments of the present invention may incorporate a wireless data coupling between the camera module 170 and the controller 190 and/or portable computer device. The wireless coupling may include disposing and configuring wireless transceivers in both the camera module 170 and controller 190 in accordance with known wireless data protocols such as Bluetooth. Alternative embodiments with or without the controller are illustrated and described below in reference to FIGS. 4-5.

Figure 2:
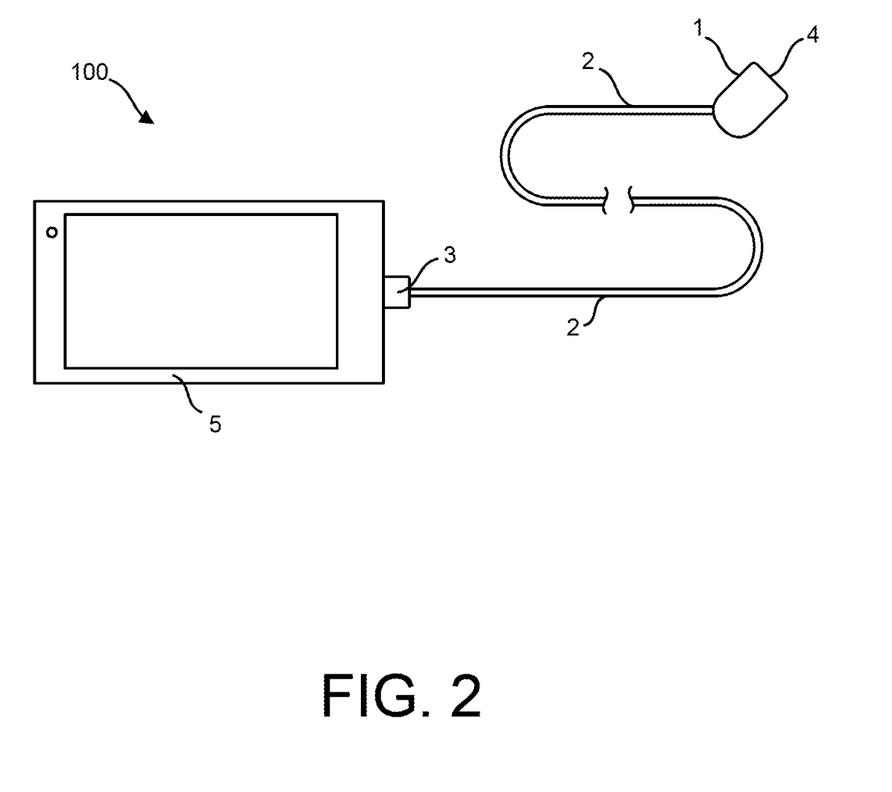
FIG. 2 illustrates a schematic view of an external camera system in accordance with embodiments of the present invention.

Reference is next made to FIG. 2, which illustrates a schematic view of an external camera system, designated generally at 100. The illustrated system 100 embodiment includes a portable computer device (PCD) 5, a PCD connector 3, a data coupler 2, a camera 1, and a lens 4. A PCD is defined as any type of small portable computing device that includes integrated wireless data transfer functionalities, a power source, a display screen, and at least one user input device. In addition, a PCD is defined as having an external form factor smaller than twenty cubic inches. Examples of a PCD include but are not limited to a smartphone, minicomputer, e-reader, tablet, or tablet phone. The camera 1 is an external unit having a form factor smaller than three cubic inches. In the illustrated embodiment, the camera 1 is physically connected to the PCD 5 via the data coupler 2 via the PCD connector 3. As described above, the data coupler 2 may utilize a wired (shown in the Figures) or wireless data communication medium in accordance with embodiments of the present invention.

Although not illustrated, it will be appreciated that the PCD 5 may include a specific application configured to operate with the camera 1. The application may include various photo and video features such as editing, storing, sharing, etc. The application may also interface with other apps to enable seamless social media sharing or cloud storage. The application may receive various user inputs on the PCD 5 that are converted into instructions transmitted to the camera 1. The instructions may affect one or more variable functions of the camera such as audio, video resolution, position data, recording status, etc.

Figure 3:
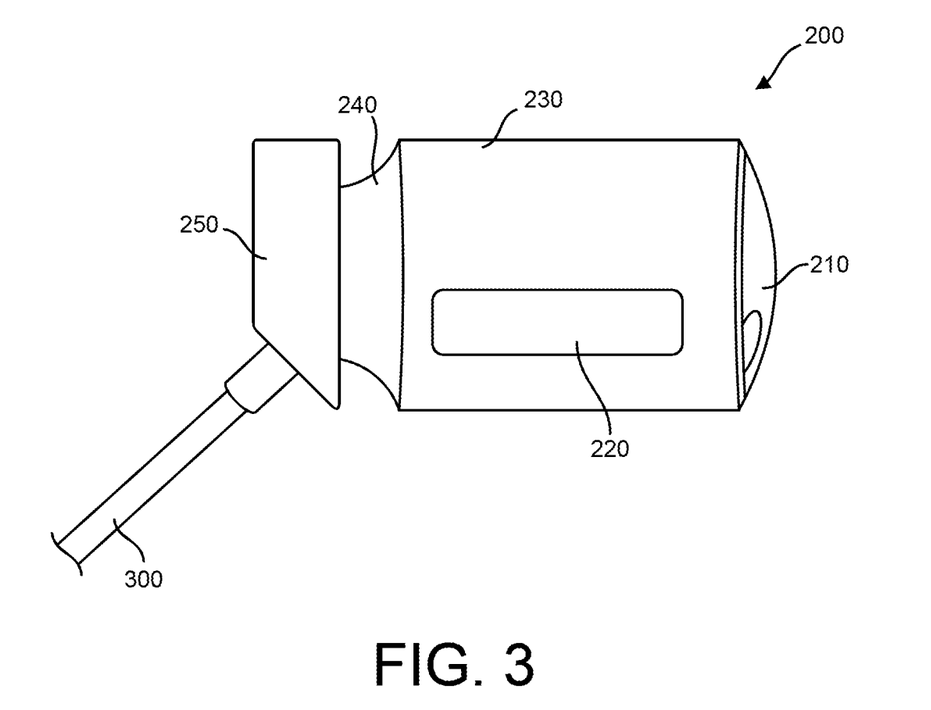
FIG. 3 illustrates a detailed perspective view of a camera system in accordance with embodiments of the present invention.

Reference is next made to FIG. 3, which illustrates a detailed perspective view of a camera system, designated generally at 200. The camera 200 includes a lens 210, detent 220, body 230, recess 240, rear housing 250, and data coupler 300. The camera 200 further includes internal components such as a detector and printed circuit board electrically coupled with a data coupler 300. The illustrated camera 200 is substantially cylindrical, but it will be appreciated that other shapes may be implemented in accordance with alternative embodiments. The external shape of the camera 200 in the illustrated embodiment is less than three cubic inches. The lens 210 is positioned on a distal end to facilitate a particular field of view of at maximum 180 degrees. The detent 210 is a recess within the body 230 which may facilitate one or more coupling schemes. The body 230 is a substantially cylindrical region with the lens 210 on one lengthwise side opposite the data coupler 300. The recess 240 is disposed between the body 230 and the rear housing 250 to facilitate additional coupling schemes. The rear housing 250 is coupled to the data coupler 300 and includes a flanged surface over the recess 240, which may also facilitate coupling schemes. As described above, the data coupler 300 may utilize a wired (shown in Figures) or wireless data communication medium in accordance with embodiments of the present invention.

Figure 4:
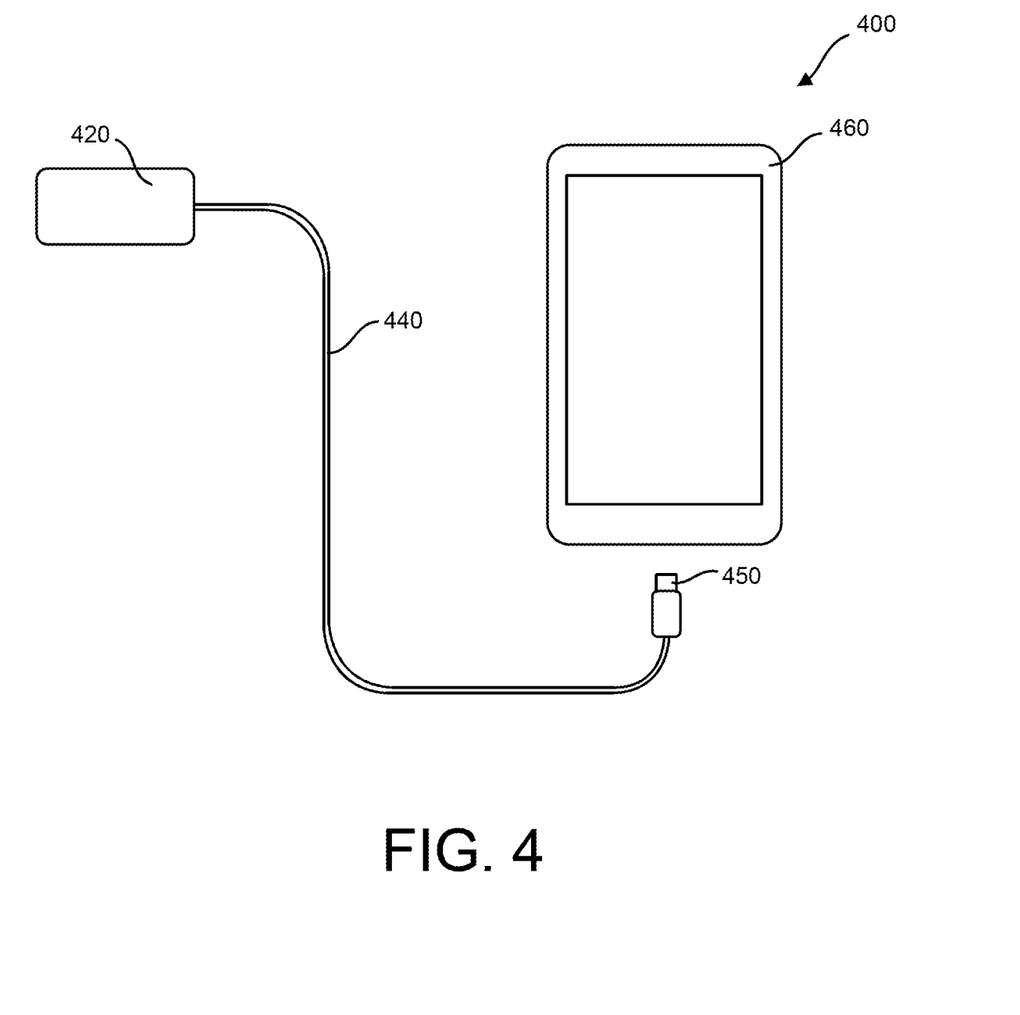
FIG. 4 illustrates a schematic view of a camera system in accordance with embodiments of the present invention.
Figure 5:
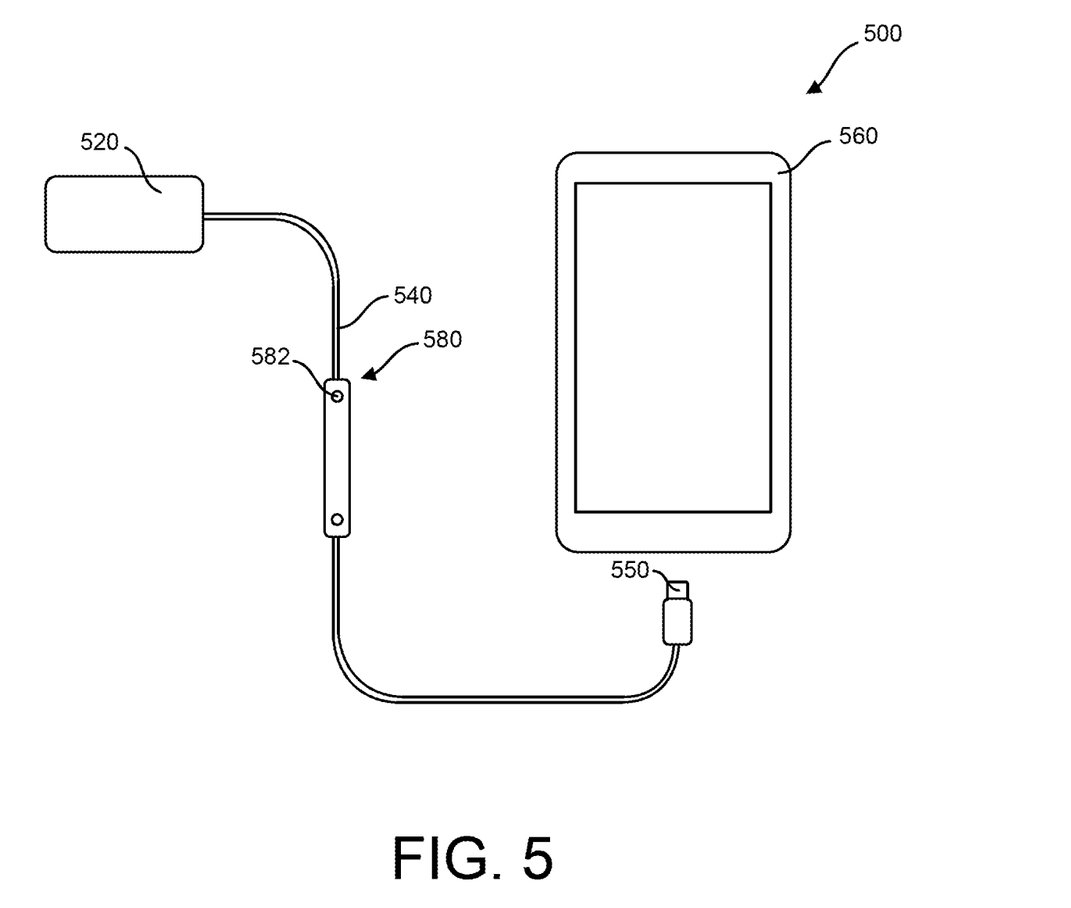
FIG. 5 illustrates a schematic view of a camera system in accordance with embodiments of the present invention.

Reference is next made to FIGS. 4-5, which illustrate schematic drawings of two alternative camera systems in accordance with embodiments of the present invention, designated generally at 400 and 500 respectively. FIG. 4 illustrates a camera system 400 including a camera 420, data coupler 440, coupler 450, and portable computer device 460. The data coupler 440 transmits both data and electrical power between the camera 420 and the portable computer device 460. The data coupler 440 may be coupled to the portable computer device 460 via a removable data coupler 450 such as a LIGHTNING or USB type coupler. FIG. 5 illustrates an alternative camera system 500 including a camera 520, data coupler 540, controller 580, coupler 550, and portable computer device 560. The data coupler 540 transmits both data and electrical power between the camera 520 and the portable computer device 560 as described above. The data coupler 540 may be coupled to the portable computer device 560 via a removable data coupler 550 such as a LIGHTNING or USB type coupler. The data coupler 540 further includes a controller 580 disposed between the camera 520 and the portable computer device 560. The controller 580 may be configured to control one or more functions of the camera 520 via a user input device 582 such as a button. The controller 580 provides a parallel method for receiving user input to control functional parameters relating to the camera 520. For example, a button user input device on the controller 580 may turn on and off the recording status of the camera 520. The controller 580 may transmit the user input to the portable computer device 560, which then alters the camera 520 parameters relating to ON and OFF recording status. As described above, the data coupler 440,540 may utilize a wired (shown in Figures) or wireless data communication medium in accordance with embodiments of the present invention.

Figure 6A:
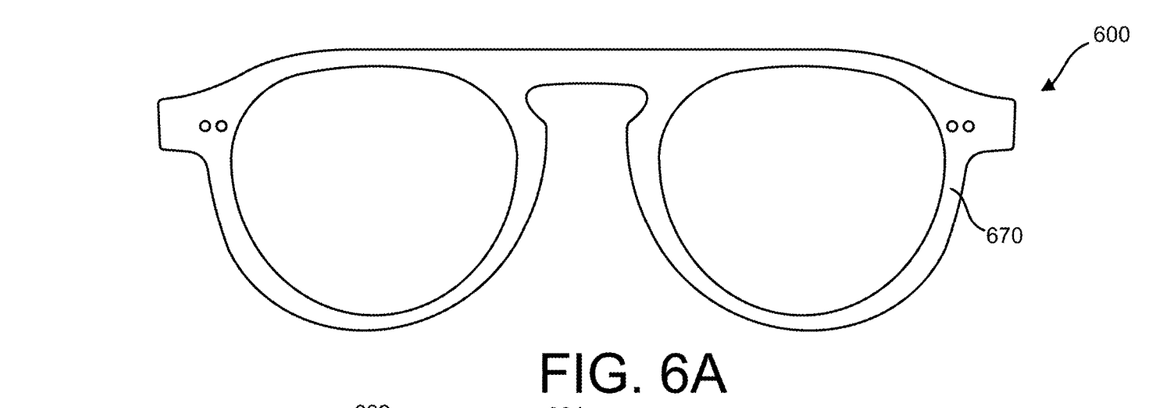
FIGS. 6A-D illustrate profile views of a glasses-type user head accessory and multiple magnet placement embodiments.
Figures 6B, 6C, 6D:
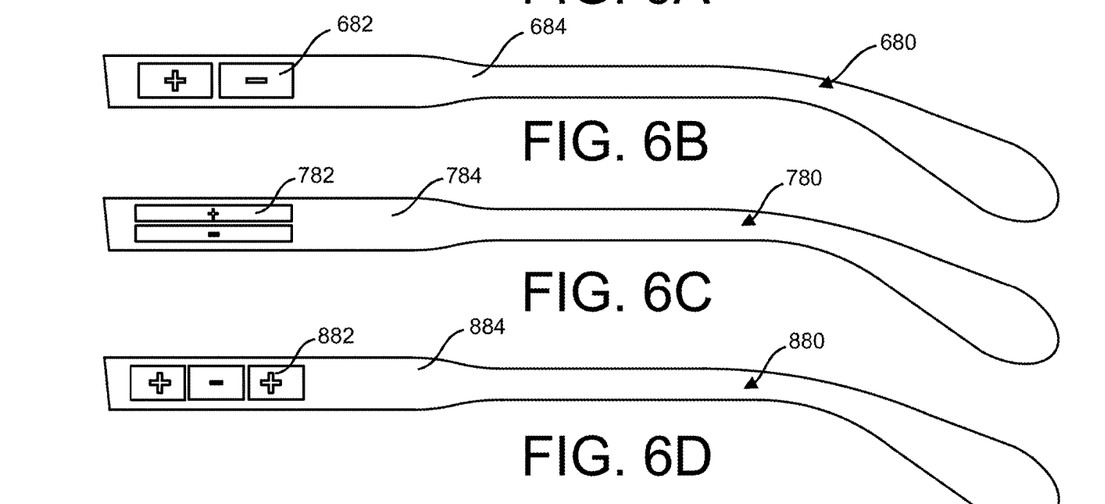

Reference is next made to FIGS. 6A-D, which illustrate multiple embodiments of a glasses-type user head accessory, designated generally at 660. FIG. 6A illustrates the front frame 670 portion of the glasses 660. The front frame 670 includes recesses within which to position the lenses. The front frame 670 is shaped to be positioned anatomically over a user's nose. The front frame 670 is hinge coupled to two rear frames which extend over the user's ears respectively. The glasses 660 are supported on a user's head triangularly between the user's nose and ears. FIGS. 6B-D illustrate alternative rear frame configurations 680, 780, 880. It will be appreciated that the glasses 660 include two rear frames, although only one is shown in each of the alternative embodiments (FIGS. 6B-D). The alternative rear frames 680, 780, 880 each include a frame member 684, 784, 884 and a magnetic region 682, 782, 882. The magnetic region 682, 782, 882 includes one (not shown) or more magnets oriented in a frontal portion of the frame member 684, 784, 884 corresponding to an anatomical temple region of a user. The magnetic regions 682, 782, 882 include orienting the magnets with particular polarities (+/−) facing outward. It will be appreciated that the magnets within the rear frames 680, 780, 880 may be embedded, painted, or otherwise concealed so as not to be externally visible. The corresponding camera module (element 170; See FIG. 1) may also include one or more magnets positioned and oriented on a surface to correspond to the magnet(s) of the rear frame 680, 780, 880. It is well known that opposite magnetic polarities create an attraction force in proximity to one another. The magnet(s) on the camera module are oriented with opposite polarities to the magnet(s) of the rear frame 680, 780, 880. A user may then position the camera module adjacent to the rear frame 680, 780, 880 to engage a releasable coupling between the camera module and the glasses 660. In addition, the positioning of the magnet(s) may also effectively bias the camera module into an orientation with respect to the glasses. For example, the attraction force between the magnets of the camera module and rear frame may align the camera module's lens with the lenses of the glasses. Therefore, the magnetic coupling system may both releasably couple and align the camera module with the user head accessory.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. A camera system for use with a portable computer device comprising:
   a portable computer device including at least one of a smartphone, tablet, tablet phone having a total volume smaller than twenty cubic inches;
   a camera module having an outer dimension smaller than three cubic inches, wherein the camera module includes a data coupler, battery, lens, image sensor, circuit board, and microphone, and wherein the camera module is configured to generate data from at least one of the image sensor or microphone;
   wherein the camera module is configured to transmit and receive data from the portable computer device via the data coupler, wherein the transmitted data includes video data and the received data includes on/off recording;

a user head mounted accessory including at least one of a pair of glasses, hat, headband, and jewelry; and a magnetic coupling system configured to selectively releasably couple the camera module directly with the user head accessory, wherein the magnetic coupling system includes a magnet disposed within each of the camera module and the user head accessory, and wherein the magnetic coupling system includes a coupled state with the camera module directly coupled to the user head mounted accessory via a magnetic force between the magnet within the camera module and the head mounting accessory.

2. The system of claim 1, wherein the magnetic coupling system further includes at least two magnets disposed within each of the camera module and user head accessory, and wherein the magnets of the camera module and user head accessory are configured to both releasably couple the camera module to the user head accessory and orient the camera module with respect to the user head accessory.

3. The system of claim 2, wherein the at least two magnets disposed within each of the camera module and user hear accessory each include at least one positive and one negative polarity magnet.

4. The system of claim 2, wherein the at least two magnets disposed within the user head accessory include two magnets lengthwise adjacently disposed.

5. The system of claim 2, wherein the at least two magnets disposed within the user head accessory include two magnets parallel adjacently disposed orthogonal to the lengthwise dimension of the user head accessory.

6. The system of claim 2, wherein the at least two magnets disposed within the user head accessory include at least three magnets lengthwise adjacently disposed, and wherein the polarity of the at least three magnets is alternating along the lengthwise dimension of the user head accessory.

7. The system of claim 1, wherein the data coupler includes a wired electrical coupling between the camera module and the portable computer device.

8. The system of claim 7 further including a controller disposed between the camera module and the portable computer device, wherein the controller is coupled directly to the camera module and the portable computer device via the wired electrical coupling.

9. The system of claim 8, where in the controller is configured to at least activate and deactivate the generation of data by the camera module.

10. The system of claim 1, wherein the data coupler includes a wireless data coupling between the camera module and the portable computer device.

11. The system of claim 10, wherein the wireless data coupling includes a Bluetooth wireless data protocol.

12. The system of claim 1, wherein the coupled state of the magnetic coupling system includes a rotational coupling between the camera module and the user head accessory.

13. The system of claim 12, wherein the rotational coupling is configured to maintain the magnetic coupling between the camera module and the user head accessory while allowing the camera module to be selectively rotatable with respect to the user head accessory.

14. The system of claim 1, wherein the user head accessory is a pair of sunglasses.

15. The system of claim 1, wherein the portable computer device is a smartphone.

16. The system of claim 1, wherein the user mounted head accessory and magnetic coupling are configured to substantially align the camera module with the field of view of the user.

17. The system of claim 16, wherein the substantial alignment between the camera module and the field of view of the user includes three dimensionally orienting the lens of the camera module with the field of view of the user.

18. The system of claim 1, wherein the camera module is configured to generate high definition video data.

19. A camera system for use with a portable computer device comprising:

a portable computer device including at least one of a smartphone, tablet, tablet phone having a total volume smaller than twenty cubic inches;

a camera module having an outer dimension smaller than three cubic inches, wherein the camera module includes a data coupler, battery, lens, image sensor, circuit board, and microphone, and wherein the camera module is configured to generate data from at least one of the image sensor or microphone;

wherein the camera module is configured to transmit and receive data from the portable computer device via the data coupler, wherein the transmitted data includes video data and the received data includes on/off recording;

a user head mounted accessory including at least one of a pair of glasses, hat, headband, and jewelry; and a magnetic coupling system configured to selectively releasably couple the camera module directly with the user head accessory, wherein the magnetic coupling system includes a magnet disposed within each of the camera module and the user head accessory, and wherein the magnetic coupling system includes a coupled state with the camera module directly coupled to the user head mounted accessory via a magnetic force between the magnet within the camera module and the head mounting accessory. And wherein the user mounted head accessory and magnetic coupling are configured to substantially align the camera module with the field of view of the user.

20. A camera system for use with a portable computer device comprising:

a portable computer device including at least one of a smartphone, tablet, tablet phone having a total volume smaller than twenty cubic inches;

a camera module having an outer dimension smaller than three cubic inches, wherein the camera module includes a data coupler, battery, lens, image sensor, circuit board, and microphone, and wherein the camera module is configured to generate data from at least one of the image sensor or microphone;

wherein the camera module is configured to transmit and receive data from the portable computer device via the data coupler, wherein the transmitted data includes video data and the received data includes on/off recording;

a user head mounted accessory including at least one of a pair of glasses, hat, headband, and jewelry; and a magnetic coupling system configured to selectively releasably couple the camera module directly with the user head accessory, wherein the magnetic coupling system includes a magnet disposed within each of the camera module and the user head accessory, and wherein the magnetic coupling system includes a coupled state with the camera module directly coupled to the user head mounted accessory via a magnetic force between the magnet within the camera module and the head mounting accessory, and wherein the coupled state of the magnetic coupling system includes a rotational coupling between the camera module and the user head accessory further configured to maintain the magnetic coupling between the camera module and the user head accessory while allowing the camera module to be selectively rotatable with respect to the user head accessory.

* * * * *